(12) United States Patent
Gerhardt et al.

(10) Patent No.: US 11,378,193 B2
(45) Date of Patent: Jul. 5, 2022

(54) AXIAL DIVERTER/MIXING VALVE

(71) Applicants: Heinrich Gerhardt, Redondo Beach, CA (US); Adam M. Poost, El Segundo, CA (US)

(72) Inventors: Heinrich Gerhardt, Redondo Beach, CA (US); Adam M. Poost, El Segundo, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 32 days.

(21) Appl. No.: 16/907,512

(22) Filed: Jun. 22, 2020

(65) Prior Publication Data
US 2021/0396322 A1 Dec. 23, 2021

(51) Int. Cl.
*F16K 11/076* (2006.01)
*F16K 27/04* (2006.01)

(52) U.S. Cl.
CPC .......... *F16K 11/076* (2013.01); *F16K 27/041* (2013.01)

(58) Field of Classification Search
CPC . F16K 11/076; F16K 27/041; Y10T 137/8655
See application file for complete search history.

(56) References Cited

U.S. PATENT DOCUMENTS

| 2,583,242 | A | * | 1/1952 | Turkenkoph | ........ F16K 11/0743 91/443 |
| 6,250,097 | B1 | | 6/2001 | Lui et al. | |
| 6,663,044 | B1 | | 12/2003 | Munoz et al. | |
| 6,848,261 | B2 | | 2/2005 | Claeys | |
| 6,904,936 | B2 | * | 6/2005 | Ma | .......... F16K 11/076 137/625.11 |
| 2005/0150965 | A1 | * | 7/2005 | Taylor | ................ G05D 23/1313 236/12.1 |
| 2017/0152956 | A1 | * | 6/2017 | Sansum | ............. G05D 23/1313 |
| 2018/0149277 | A1 | * | 5/2018 | Hattan | .................... F16K 21/00 |

FOREIGN PATENT DOCUMENTS

| CN | 2791398 Y | 6/2006 |
| GB | 498834 A | 1/1939 |

OTHER PUBLICATIONS

International Search Report for corresponding PCT/US2021/033519 dated Sep. 10, 2021.

* cited by examiner

*Primary Examiner* — Kevin R Barss
(74) *Attorney, Agent, or Firm* — Tarolli, Sundheim, Covell & Tummino LLP

(57) ABSTRACT

A diverter/mixing valve is provided that includes a main outer housing and a barrel assembly disposed inside the main outer housing. When actuated, an actuator rotates the barrel assembly between an open end inlet position where a first fluid stream flows into a first inlet port and a second fluid stream is blocked from flowing into a second inlet port, and an open side inlet position where the second fluid stream flows into the second inlet port and the first fluid stream is blocked from flowing into the first inlet port.

20 Claims, 5 Drawing Sheets

AXIAL DIVERTER/MIXING VALVE

TECHNICAL FIELD

This disclosure relates generally to diverter valves and more specifically, to an axial diverter/mixing valve.

BACKGROUND

Typical air diverters or mixing valves are made with a swinging-vane (or shutter) configuration to divert airflow to one of two or both outlets. The swinging-vane configuration includes a vane or shutter attached to a shaft that pivots or rotates the vane. As the vane is rotated in one direction, the airflow is diverted in one direction and as the vane is rotated in an opposite direction, the airflow is diverted in another direction. The vane can be rotated at a point or points between the two directions so as to divert the airflow in both directions. The swinging-vane diverter/mixing valve configuration however, is inherently significantly large. In addition, the swinging-vane configuration is not pressure-balanced, which means they require substantial force to operate the diverting vane. In addition, swinging-vane configurations require an actuator as a separate add-on part, which makes their assembled size even larger.

SUMMARY

The following presents a simplified summary in order to provide a basic understanding of the subject disclosure. This summary is not an extensive overview of the subject disclosure. It is not intended to identify key/critical elements or to delineate the scope of the subject disclosure. Its sole purpose is to present some concepts of the subject disclosure in a simplified form as a prelude to the more detailed description that is presented later.

One example of the subject disclosure includes a diverter/mixing valve that includes a main outer housing having a first inlet port, a second inlet port, and an outlet port. A barrel assembly is rotatably disposed inside the main housing and includes an inner sleeve having inner flow openings defined therein and an outer sleeve having outer flow openings defined therein. An actuation device is rotatably connected to the inner sleeve of the barrel assembly. The actuation device rotates the barrel assembly between an open end inlet position where a first fluid stream flows into the first inlet port, through the inner sleeve, and out the outlet port and a second fluid stream is blocked from flowing into the second inlet port, and an open side inlet position where the second fluid stream flows into the second inlet port, through the outer sleeve, and out the outlet port and the first fluid stream is blocked from flowing into the first inlet port.

Another example of the subject disclosure includes a diverter/mixing valve that includes a main outer housing having a first inlet port, a second inlet port, an outlet port, and an inner support having a frustoconical shape. The inner support includes a first end that forms a channel around an inner perimeter of the first end and is connected to the first inlet port. The inner support further includes a second end distally located from the first end, a side surface that extends circumferentially from the first end to the second end of the inner support, and inlet openings defined in opposite sides of the side surface. A barrel assembly is rotatably disposed inside the main housing and includes an inner sleeve and an outer sleeve. The inner sleeve has a conical shape and includes a first end slidably disposed in the channel, a second end distally located from the first end, a side surface circumferentially extending from the first end to the second end of the inner sleeve, and inner flow openings defined in opposite sides of the side surface. The inner sleeve mates with the inner support of the main housing when the barrel assembly is inserted into the main housing. The outer sleeve has a cylindrical shape and includes a first end attached to the first end of the inner sleeve, where the first end of the outer sleeve being slidably disposed in the channel, a second end distally located from the first end, a side surface circumferentially extending from the first end to the second end of the outer sleeve, and outer flow openings defined in opposite sides of the side surface. An actuation device includes a rotating disk rotatably connected to the second end of the inner sleeve of the barrel assembly. The actuation device rotates the barrel assembly between the open inlet position and the open side inlet position to align the inner flow openings with the inlet openings defined in the inner support of the main housing to allow a first fluid stream to flow into the first inlet port, through the inner sleeve, and out the outlet port and to block a second fluid stream from flowing into the second inlet port. The actuation device also aligns the outer flow openings with the second inlet port of the main housing to allow the second fluid stream to flow into the second inlet port through the outer sleeve and out the outlet port and to block the first fluid stream from flowing into the first inlet port.

BRIEF DESCRIPTION OF THE DRAWINGS

The accompanying drawings, which are incorporated in and constitute a part of the specification, illustrate various systems, methods, and other examples of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
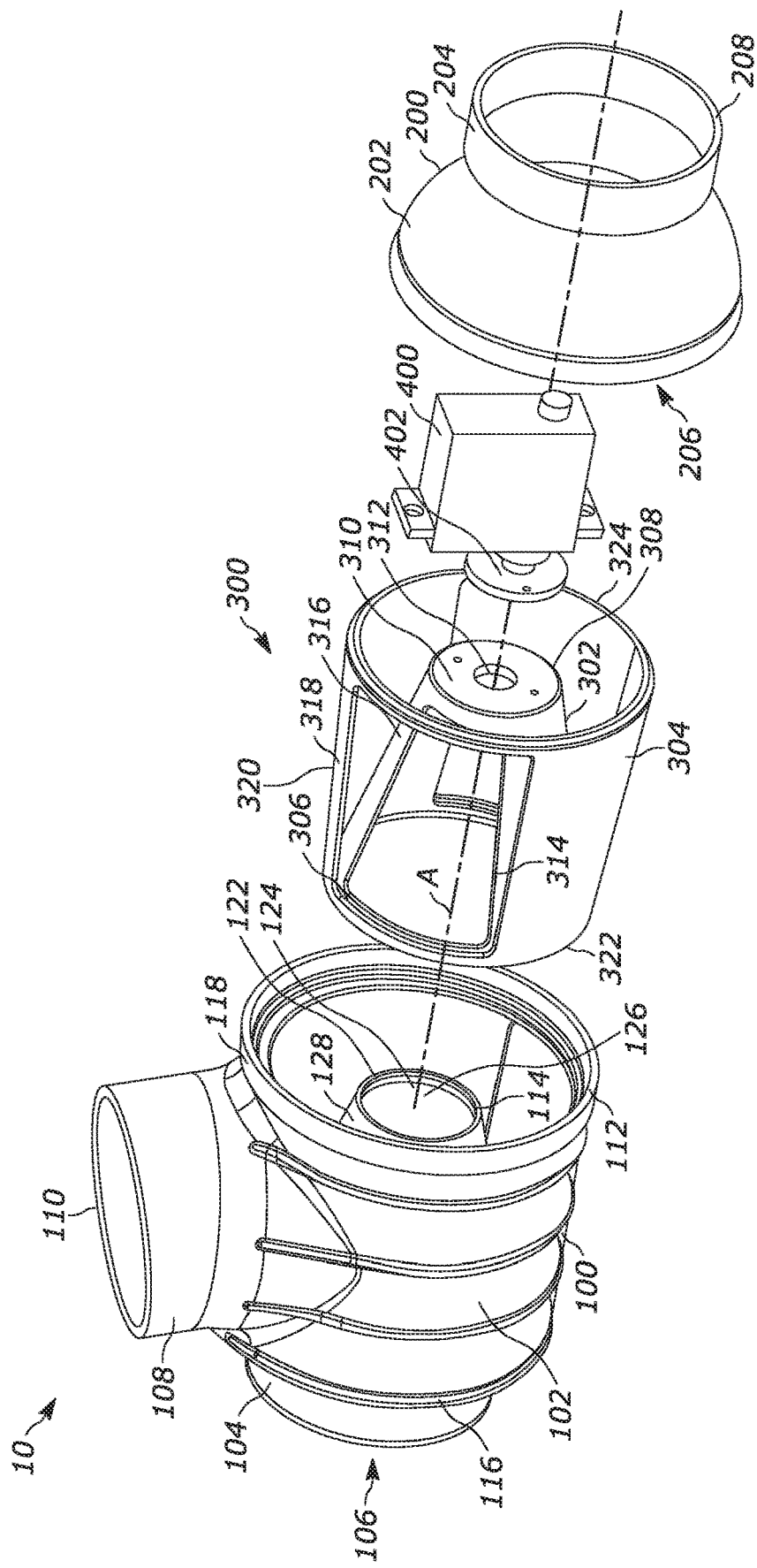
FIG. 1 is an exploded view of an example axial diverter/mixing valve assembly.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure can be practiced without these specific details. In other instances, well-known structures and devices are shown in block diagram form in order to facilitate describing the subject disclosure.

While specific characteristics are described herein (e.g., thickness, orientation, configuration, etc.), it is to be understood that the features, functions and benefits of the subject disclosure can employ characteristics that vary from those described herein. These alternatives are to be included within the scope of the disclosure and claims appended hereto.

Disclosed herein is an example axial diverter/mixing valve assembly having a concentric and compact configuration that allows fluid flows (e.g., gas (e.g., air) streams, liquids) from two inlet sources to be mixed into a common single outlet stream. Conversely, the airflow may be reversed such that an incoming single source fluid flow is diverted to one of two outlets or simultaneously to both outlets. The concentric, axial design of the axial diverter/mixing valve results in a compact, lightweight package relative to its performance, which enables its integration into a packaging- and space-challenged vehicle such as aircraft (e.g., controlling airflow as part of an Environmental Control System (ECS) on aircraft) as well as ground-based vehicles. As mentioned above, typical diverting valves are inherently large, which prohibits their use in space-challenged vehicles. Although, the axial diverter/mixing valve assembly has a compact design, it can be scaled to any size to appropriately fit the application.

In addition, the concentric, axial design forms an inherently pressure-balanced design which allows a relatively small actuation device to operate the valve thereby contributing to the compactness of the valve. Still further, the actuation device can be integrated within the physical volume of the valve assembly which further enhances its compactness. Still yet another advantage of the concentric, axial design is ability to produce the valve via an additive manufacturing (3D-printing) process suitable for end-use production parts.

The axial diverter/mixing valve assembly can be used in manned air vehicles as a mixing valve in the ECS to provide temperature conditioning for cockpit environment by variably mixing hot and cold supply airflows. The valve assembly can also divert ECS airflow from floor outlets to face outlets for crew comfort and can provide cockpit humidity control by mixing outside air with inside conditioned airflow. In addition, the axial diverter/mixing valve assembly can also be utilized in unmanned air vehicles to provide temperature-regulated avionics cooling air in lieu of liquid cooling and/or to provide conditioned airflow to keep optical sensor windows clear.

Figure 2:
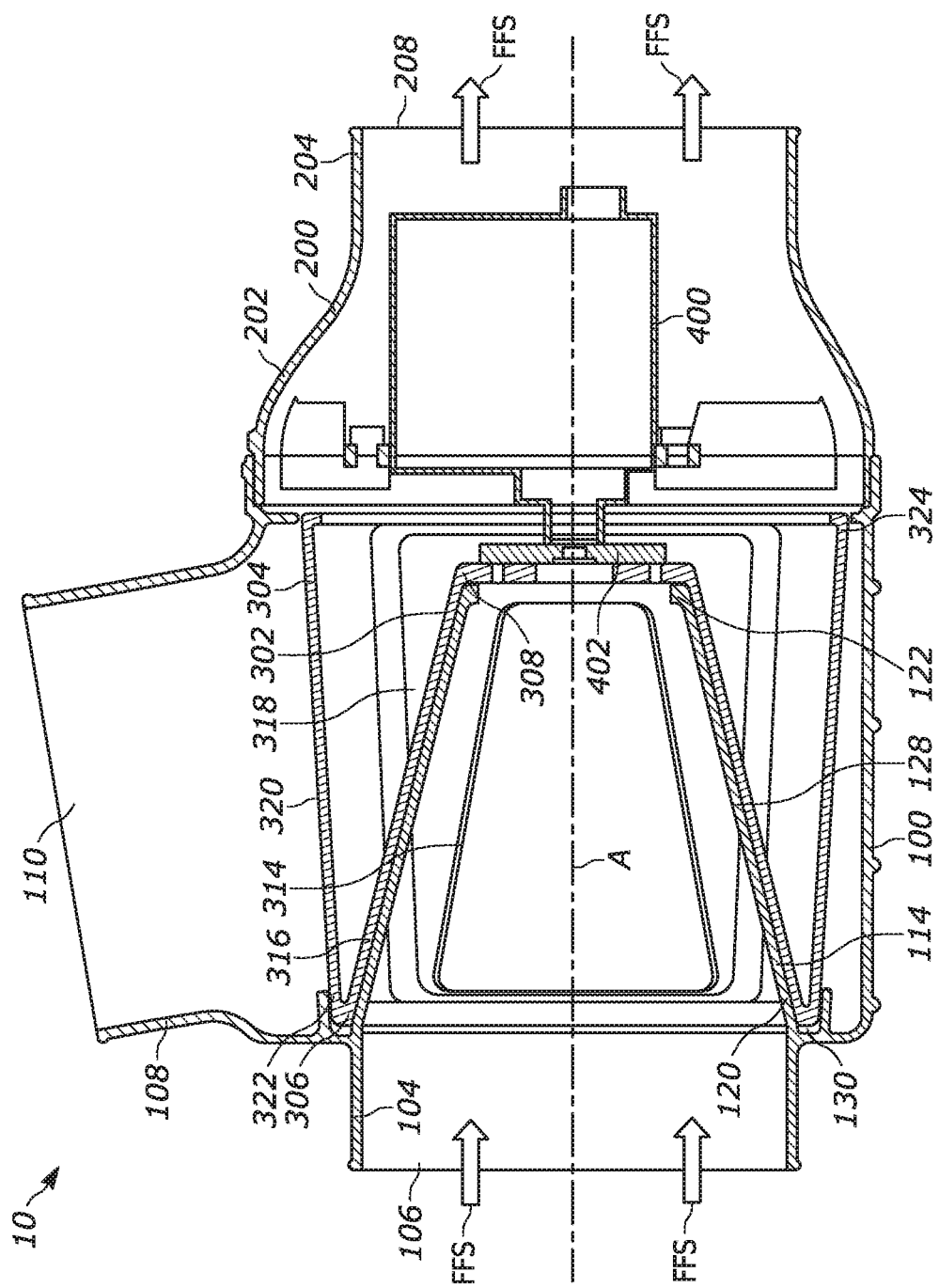
FIG. 2 is a cross-section view of the example axial diverter/mixing valve assembly in a position where a fluid flows into an end inlet and out an outlet.
Figure 3:
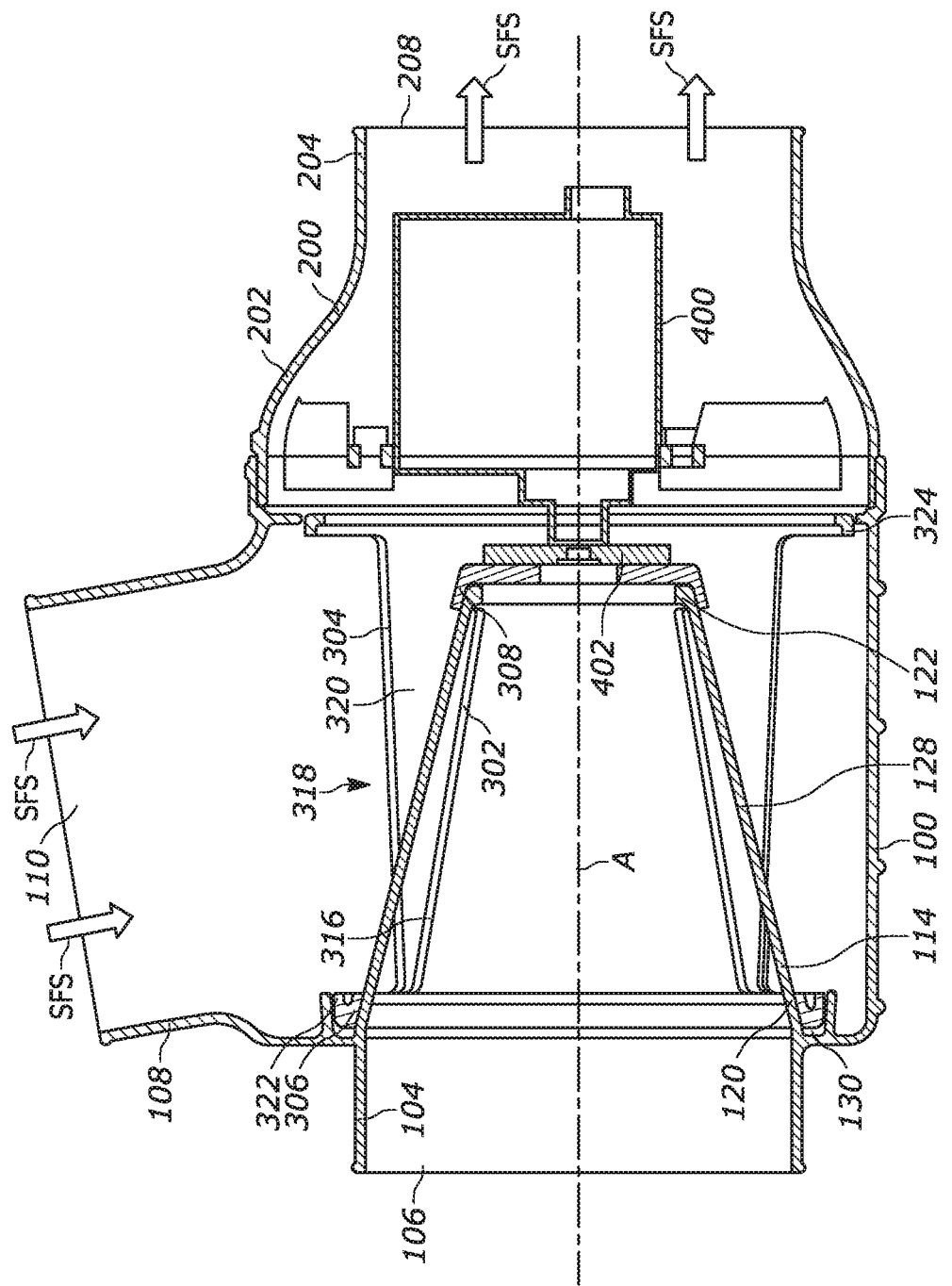
FIG. 3 is a cross-section view of the example axial diverter/mixing valve assembly in a position where the fluid flows into a side inlet and out the outlet.

FIG. 1 is an exploded view of an example axial diverter/mixing valve assembly 10 and FIGS. 2 and 3 are cross-section views of the example valve assembly 10 in a position illustrating where a fluid flows into an end inlet port (open end inlet position) and into a side inlet port (open side inlet position) respectively. In the open end inlet position, the valve assembly 10 is in a position where a fluid flows into the valve assembly 10 via the end inlet port and the fluid is prohibited from flowing into the valve assembly 10 via the side inlet port. In the open side inlet position, the valve assembly 10 is in a position where the fluid flows into the valve assembly 10 via the side inlet port and the fluid is prohibited from flowing into the valve assembly 10 via the end inlet port.

The valve assembly 10 includes a main outer housing 100, an outlet housing 200, a barrel assembly 300, and an activation device 400. The barrel assembly 300 rotates 90 degrees in reference to two inlets to allow fluid flow (e.g., airstream, fluid stream) to flow into either one of the two inlet ports and out through the outlet housing 200. Alternatively, the barrel assembly 300 can be rotated to an intermediate setting (e.g., between 0 and 90 degrees) such that the fluid flow flows though both inlet ports simultaneously, mixes inside the main housing 100, and flows out through the outlet housing 200. In still yet another embodiment, the barrel assembly 300 can rotate of 360 degrees to allow fluid to flow into the first and/or second inlet ports.

The main housing 100 has a circular cross-section shape and can be made from any material such as, but not limited to plastic or metal (e.g., steel, aluminum, etc.). The main housing 100 includes a body 102, a first inlet (end inlet) port 104 having a first opening (first (end) inlet opening) 106, a second inlet (side inlet) port 108 having a second opening (second (side) inlet opening) 110, an outlet port 112, and an inner sleeve/support 114. The first inlet port 104 is situated at a first end 116 of the body 102 and the outlet port 112 is situated at a second end 118 of the body 102. The second inlet port 108 is situated on a side of the body 102. The first and second inlet openings 106, 110 have a diameter that is less than a diameter of the body 102 of the main housing 100. In addition, the first and second inlet ports 104, 108 are configured to receive fluid flow inlet lines from, for example, an air conditioning unit, outside air, etc. The outlet port 112 has a diameter that is approximately equal to the diameter of the body 102 and is configured to receive the outlet housing 200.

The inner support 114 (better illustrated in FIGS. 2 and 3) has frustoconical shape that projects and tapers in diameter starting from a first end (base) 120 connected to the first inlet port 104 and progressing toward a second (apex) end 122 near the outlet port 112. In an alternate embodiment, the inner support 114 may have a cylindrical shape. The second end 122 has an open ended configuration 124, but may also be a closed ended configuration. The inner support 114 has inlet openings 126 opposite to each other defined in a side surface 128 of the inner support 114. The inlet openings 126 work in communication with openings defined in the barrel assembly 300 described further below. In addition, the first end 120 of the inner support 114 has a U-shape configuration to thereby form a channel 130 that extends around an inner perimeter of the first end 116 of the main housing 100.

The outlet housing 200 has a circular cross-section shape and can be made from any material as the main housing 100 such as, but not limited to plastic or metal (e.g., steel, aluminum, etc.). The outlet housing 200 includes an inlet connecting portion 202 and an outlet portion 204. The inlet connecting portion 202 has an inlet connecting portion opening 206 that has a diameter slightly less than the diameter of the outlet port 112 of the main housing 100 such that the inlet connecting portion 202 slides into the outlet port 112 in the main housing 100. The outlet portion 204 has an outlet opening 208 that has a diameter less than the diameter of the inlet connecting portion opening 206 of the inlet connecting portion 202. Thus, the outlet housing 200 tapers from the inlet connecting portion opening 206 to the outlet opening 208. Alternatively, the outlet housing 200 can have a constant diameter such that the inlet connecting portion opening 206 and the outlet opening 208 have substantially the same diameter.

The barrel assembly 300 has a circular cross-section shape and rotates with respect to the main housing 100. The barrel assembly 300 can be made from any material as the main and outlet housings 100, 200 such as, but not limited to plastic or metal (e.g., steel, aluminum, etc.). The barrel assembly 300 includes an inner (first) sleeve 302 and an outer (second) sleeve 304.

The inner sleeve 302 has a conical shape that tapers in diameter starting from a first end (base) 306 connected to the first inlet port 104 and progressing toward a second (apex) end 308 near the outlet port 112. In an alternate embodiment, the inner sleeve 302 may have a cylindrical shape. The second end 308 has a closed ended configuration that includes a plate 310 with an aperture 312 defined therein. The inner sleeve 302 has inner flow openings 314 opposite to each other defined in a side surface 316 of the inner sleeve 302. The inner sleeve 302 mates with the inner support 114 in the main housing 300 when the barrel assembly 300 is inserted into the main housing 100. Thus, in any given embodiment, the inner support 114 of the main housing 100 and the inner sleeve 302 have the same shape (e.g., conical, cylindrical, etc.) to facilitate mating of the barrel assembly 300 inside the main housing 100. In addition, when the barrel assembly 300 is inserted into the main housing 100, the inner flow openings 314 work in communication with inlet openings 126 defined in the inner support 114 of the main housing 100 to allow fluid to flow into the first inlet port 104. In the example illustrated in the figures, the inner flow openings 314 have an isosceles trapezoidal shape and extend from the first end 306 to the second end 308. The inner flow openings 314 however, can be any shape and can extend between any two points between the first end 306 and the second end 308.

The outer sleeve 304 has a cylindrical shape and includes outer flow openings 318 opposite to each other defined in a side surface 320 of the outer sleeve 304. In the example illustrated in the figures, the outer flow openings 318 have a rectangular shape and extend from a first (base) end 322 connected to the first inlet port 104 to a second end 324 of the outer sleeve 304. The outer flow openings 318 however, can be any shape and can extend between any two points between the first end 322 and the second end 324. The outer flow openings 318 work in communication with the second inlet port 108 in the main housing 100 as will be described further below.

The inner and outer sleeves 302, 304 can be either an integrated piece or fixed (e.g., welded) at the first ends 306, 322 such that the inner and outer sleeves 302, 304 slidably rotate in unison in the channel 130. Thus, the first ends 306, 322 of the inner and outer sleeves 302, 304 are disposed in the channel 130 (best shown in FIGS. 2 and 4) that extends around an inner perimeter of the first end 116 of the main housing 100. The channel 130 secures the first ends 306, 322 of the inner and outer sleeves 302, 304 during rotation of the barrel assembly 300.

The actuation device 400 is located in the outlet housing 200 and mounts to supports 210 (see FIG. 4) inside the outlet housing 200. The actuation device 400 includes a rotating disk 402 that attaches to the plate 310 of the second end 308 of the inner sleeve 302. When a user actuates the actuation device 400 via an external controller, the disk 402 rotates thereby rotating the barrel assembly 300 to the desired position. The configuration of the valve assembly 10 and the barrel assembly 300 create a balance of pressure around the barrel assembly 300 inside the main housing 100. The pressure balance acts on the barrel assembly 300 and as a result, very little force is required to rotate the barrel assembly 300. Therefore, the actuation device 400 can be small device to accommodate the compactness of the valve assembly 10. For example, the actuation device 400 can be a radio controlled servo, an electronic actuator, a hydraulic actuator, a pneumatic actuator, a small motor, etc.

Figure 4:
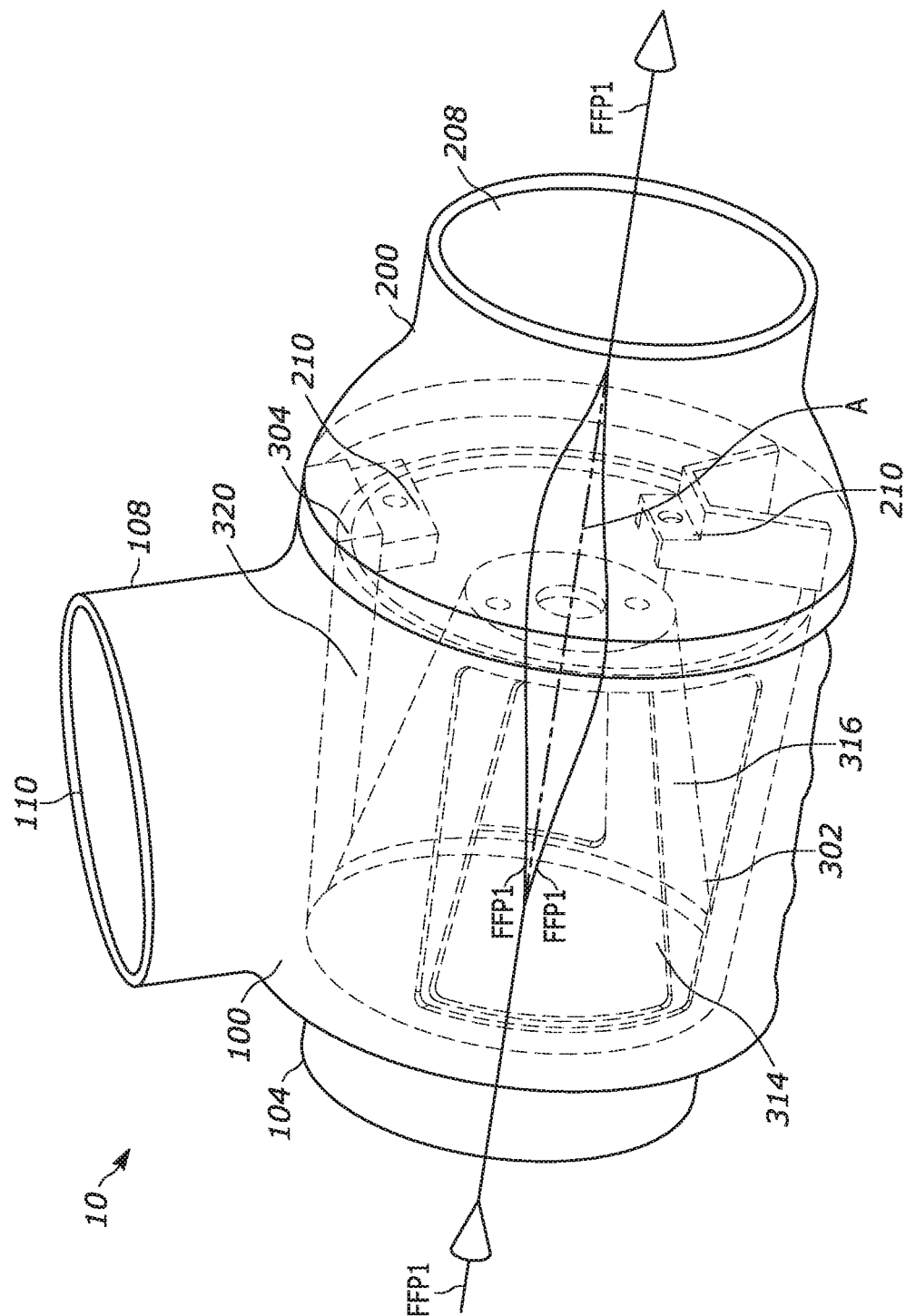
FIG. 4 is a side perspective view of the example axial diverter/mixing valve assembly in a position illustrating a fluid flow path through the end inlet and out the outlet.

FIG. 4 is a side perspective view of the example valve assembly 10 in the open end inlet position illustrating a first fluid flow path FFP1 into the first inlet port 104 via the end inlet opening 106 and out the outlet opening 208 (the actuation device 400 is not shown for clarity). In the open end inlet position, a first fluid stream FFS (e.g., gas, liquid) (see FIG. 2) flows into the end inlet port 104 from an external source (e.g., air conditioner, outside air, etc.). Specifically, in the open end inlet position, the barrel assembly 300 is rotated such that the inner flow openings 314 of the inner sleeve 302 are aligned with the inlet openings 126 in the inner support 114. In addition, the outer flow openings 318 defined in the side surface 320 of the outer sleeve 304 are not aligned with the side inlet opening 110. Thus, as illustrated by the first fluid flow path FFP1, the first fluid stream FFS travels into the first inlet port 104 via the end inlet opening 106 into and through the first end 306 of the inner sleeve 302 and out each inner flow opening 314 defined in the side surface 316 of the inner sleeve 302. The first fluid stream FFS continues to travel out of the barrel assembly 300 into the outlet housing 200 and out of the outlet opening 208. In addition, any other fluid stream is blocked from entering the main housing 100 through the side inlet port 108 due to the side surface 320 of the outer sleeve being aligned with the side inlet opening 110.

As illustrated in FIG. 4, the first fluid stream FFS follows the first fluid flow path FFP1 into the first inlet port 104 via the end inlet opening 106 and into the first end 306 of the inner sleeve 302. The first fluid stream FFS then splits and exits each inner flow opening 314 on opposite sides of the inner sleeve 302. The first fluid stream FFS then travels around the plate 310 of the inner sleeve 302 and out the outlet opening 208. When the first fluid stream FFS splits, the first fluid stream FFS creates a pressure on each side of the barrel assembly 300, which in turn pressure balances the barrel assembly 300. Thus, the forces acting on the barrel assembly 300 balance the barrel assembly 300 such that the barrel assembly 300 is concentric with respect to the main housing 100 and is easily rotated about a central axis A. As a result, the pressure balancing facilitates ease of rotation of the barrel assembly 300 between the open end inlet position and the open side inlet position.

Figure 5:
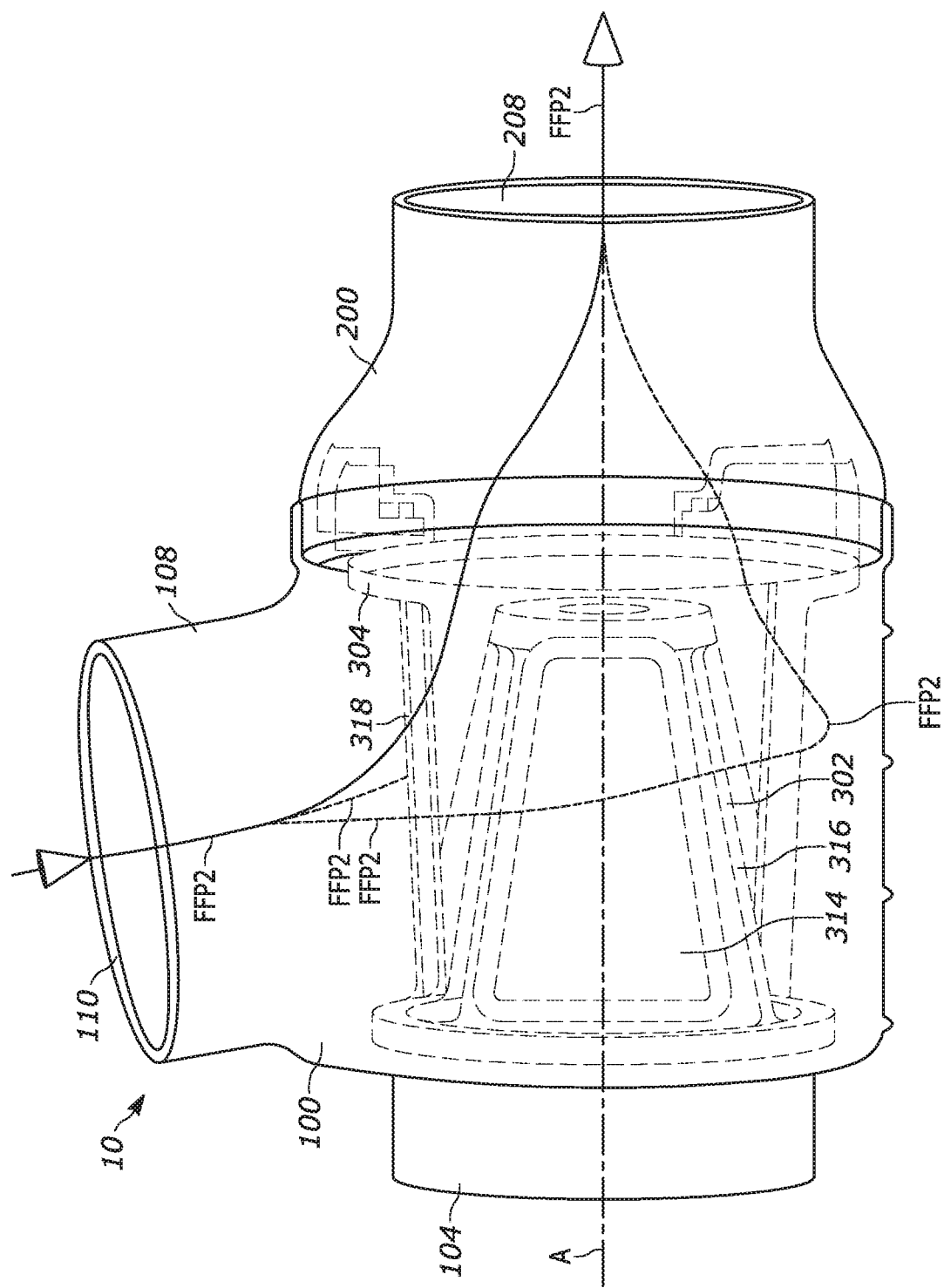
FIG. 5 is a side view of the example axial diverter/mixing valve assembly in a position illustrating a fluid flow path through the side inlet and out the outlet.

FIG. 5 is a side view of the example valve assembly 10 in the open side inlet position illustrating a second fluid flow path FFP2 into the second inlet port 108 via the side inlet opening 110 and out the outlet opening 208 (the actuation device 400 is not shown for clarity). In the open side inlet position, a second fluid stream SFS (e.g., gas, liquid) (see FIG. 3) flows into the second inlet port 108 via the side inlet opening 110 from an external source (e.g., air conditioner, outside air, etc.). Specifically, in the open side inlet position, the barrel assembly 300 is rotated such that the outer flow openings 318 of the outer sleeve 304 are aligned with the second inlet opening 110 of the main housing 100. In addition, the inner flow openings 314 defined in the side surface 320 of the inner sleeve 302 are not aligned with the inlet openings 126 of the inner support 114. In other words, the inlet openings 126 of the inner support 114 are blocked by the side surface 316 of the inner sleeve 302 and the inner flow openings 314 in the side surface 320 are blocked by the side surface 128 of the inner support. Thus, the first fluid stream FFS is unable to flow through the valve assembly 10 via the first inlet port 104.

As illustrated by the second fluid flow path FFP2 in FIG. 5, the second fluid stream SFS travels into the second inlet port 108 via the side inlet opening 110 and splits into three paths as illustrated by the solid line and the two dotted lines. Specifically, a main portion of the second fluid stream SFS follows the solid line into the outer flow opening 318 and out the outlet opening 208. The remaining second fluid stream SFS splits and travels around the outside of the side surface 320 of the outer sleeve 304 (i.e., between the outer sleeve 304 and an inside surface of the main housing 100) to the opposite outer flow opening 318. Both split fluid paths (dotted lines) then travel into the opposite outer flow opening 318 and out the outlet opening 208. When the second fluid stream SFS splits, the fluid creates a balance of pressure around the barrel assembly 300, which in turn pressure balances the barrel assembly 300. Thus, the forces acting on the barrel assembly 300 balance the barrel assembly 300 such that the barrel assembly 300 is concentric with respect to the main housing 100 and is easily rotated about a central axis A. As a result, the pressure balancing facilitates ease of rotation of the barrel assembly 300 between the open end inlet position and the open side inlet position.

Alternatively, the axial diverter/mixing valve 10 can operate in reverse where a fluid stream enters the outlet opening 208 in the outlet housing 200 and is diverted out the first inlet port 104 or out the second inlet port 108 or out both the first and second inlet ports 104, 108 simultaneously. Still further, in yet another embodiment the valve assembly 10 can be used as a mixing valve where the barrel assembly 300 rotates to an intermediate position between the open end position and the open side position. In the intermediate position, the incoming first and second fluid streams enter the first and second inlet ports 104, 108 simultaneously and are combined (mixed) inside the main housing and diverted through the outlet opening 208.

The descriptions above constitute examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A diverter/mixing valve comprising:
   a main outer housing having a first inlet port, a second inlet port, and an outlet port;
   a barrel assembly rotatably disposed inside the main housing, the barrel assembly including an inner sleeve having inner flow openings defined therein and an outer sleeve having outer flow openings defined therein; and
   an actuation device rotatably connected to the inner sleeve of the barrel assembly, the actuation device rotating the barrel assembly between an open end inlet position where a first fluid stream flows into the first inlet port, through the inner sleeve, and out the outlet port and a second fluid stream is blocked from flowing into the second inlet port, and an open side inlet position where the second fluid stream flows into the second inlet port, through the outer sleeve, and out the outlet port and the first fluid stream is blocked from flowing into the first inlet port.

2. The diverter/mixing valve of claim 1 further comprising an outlet housing having a circular cross-section, an inlet connecting portion connected to the outlet port of the main housing, and an outlet portion having an outlet opening.

3. The diverter/mixing valve of claim 2, wherein the inlet connecting portion has a diameter less than a diameter of the outlet port of the main housing such that the inlet connecting portion slides into the outlet port in the main housing.

4. The diverter/mixing valve of claim 1, wherein the first inlet port includes a first inlet port opening and is disposed at a first end of the main housing, wherein the second inlet port includes a second inlet port opening and is disposed on a side of the main housing, and wherein the outlet port includes an outlet port opening defined in a second end of the main housing opposite that of the first end.

5. The diverter/mixing valve of claim 1, wherein the main housing includes an inner support having a frustoconical shape, a first end connected to the first inlet port of the main housing that forms a channel disposed around an inner perimeter of the first end of the main housing, a second end distally located from the first end, a side surface that extends circumferentially from the first end to the second end, and inlet openings defined in opposite sides of the side surface.

6. The diverter/mixing valve of claim 5, wherein the inner sleeve has a conical shape and includes a first end slidably disposed in the channel, a second end distally located from the first end, a side surface circumferentially extending from the first end to the second end, and inner flow openings defined in opposite sides of the side surface, the inner sleeve mating with the inner support of the main housing when the barrel assembly is inserted into the main housing.

7. The diverter/mixing valve of claim 6, wherein when the barrel assembly is rotated to align the inner flow openings with the inlet openings defined in the inner support of the main housing, the first fluid stream flows into the first inlet port of the main housing, out of the aligned inlet openings of the inner support and inner flow openings of the inner sleeve, around the inner sleeve to create a balance of pressure around the barrel assembly, and out the outlet port such that the barrel assembly is pressure balanced within the main housing and is concentric with respect to the main housing along a central axis to facilitate ease of rotation of the barrel assembly.

8. The diverter/mixing valve of claim 6, wherein the inner sleeve further includes a plate attached to the second end of the inner sleeve and wherein the actuation device connects to the plate and rotates the barrel assembly when actuated.

9. The diverter/mixing valve of claim 5, wherein the outer sleeve has a cylindrical shape and includes a first end attached to the first end of the inner sleeve, the first end of the outer sleeve being slidably disposed in the channel, a second end distally located from the first end, a side surface circumferentially extending from the first end to the second end, and outer flow openings defined in opposite sides of the side surface.

10. The diverter/mixing valve of claim 9, wherein when the barrel assembly is rotated to the open side inlet position to align the outer flow openings with the second inlet port, the second fluid stream flows into the second inlet port of the main housing, around the outer sleeve to create a balance of pressure around the barrel assembly, into the outer flow openings, and out the outlet port such that the barrel assembly is pressure balanced within the main housing and is concentric with respect to the main housing along a central axis to facilitate ease of rotation of the barrel assembly.

11. The diverter/mixing valve of claim 1, wherein the actuation device is one of a radio controlled servo, an electronic actuation device, a hydraulic actuation device, a pneumatic actuation device, and a motor.

12. A diverter/mixing valve comprising:
   a main outer housing having a first inlet port, a second inlet port, an outlet port, and an inner support having a frustoconical shape, the inner support including a first end forming a channel disposed around an inner perimeter of the first end and being connected to the first inlet port, a second end distally located from the first end, a side surface that extends circumferentially from the first end to the second end of the inner support, and inlet openings defined in opposite sides of the side surface;

a barrel assembly rotatably disposed inside the main housing, the barrel assembly including an inner sleeve and an outer sleeve, the inner sleeve having a conical shape, a first end slidably disposed in the channel, a second end distally located from the first end, a side surface circumferentially extending from the first end to the second end of the inner sleeve, and inner flow openings defined in opposite sides of the side surface, the inner sleeve mating with the inner support of the main housing when the barrel assembly is inserted into the main housing, the outer sleeve having a cylindrical shape, a first end attached to the first end of the inner sleeve, the first end of the outer sleeve being slidably disposed in the channel, a second end distally located from the first end, a side surface circumferentially extending from the first end to the second end of the outer sleeve, and outer flow openings defined in opposite sides of the side surface; and an actuation device having a rotating disk rotatably connected to the second end of the inner sleeve of the barrel assembly, the actuation device rotating the barrel assembly between the open end inlet position and the open side inlet position to align the inner flow openings with the inlet openings defined in the inner support of the main housing to allow a first fluid stream to flow into the first inlet port, through the inner sleeve, and out the outlet port and to block a second fluid stream from flowing into the second inlet port, and to align the outer flow openings with the second inlet port of the main housing to allow the second fluid stream to flow into the second inlet port through the outer sleeve and out the outlet port and to block the first fluid stream from flowing into the first inlet port.

13. The diverter/mixing valve of claim 12, wherein when the barrel assembly is rotated to the open end inlet position to align the inner flow openings with the inlet openings defined in the inner support of the main housing, the first fluid stream flows into the first inlet port of the main housing, out of the aligned inlet openings of the inner support and inner flow openings of the inner sleeve, around the inner sleeve to create a balance of pressure around the barrel assembly, and out the outlet port such that the barrel assembly is pressure balanced within the main housing and is concentric with respect to the main housing along a central axis to facilitate ease of rotation of the barrel assembly.

14. The diverter/mixing valve of claim 12, wherein when the barrel assembly is rotated to the open side inlet position to align the outer flow openings with the second inlet port, the second fluid stream flows into the second inlet port of the main housing, around the outer sleeve to create a balance of pressure around the barrel assembly, into the outer flow openings, and out the outlet port such that the barrel assembly is pressure balanced within the main housing and is concentric with respect to the main housing along a central axis to facilitate ease of rotation of the barrel assembly.

15. The diverter/mixing valve of claim 12, wherein when actuated, the actuation device rotates the barrel assembly to an intermediate point between the open end inlet position and the open side inlet position to allow the first fluid stream to flow into the first inlet port and the second fluid stream into the second inlet port simultaneously wherein the first fluid stream and the second fluid mix inside the main housing and exit through the outlet port.

16. The diverter/mixing valve of claim 12 further comprising an outlet housing having a circular cross-section, an inlet connecting portion connected to the outlet port of the main housing, and an outlet portion having an outlet opening.

17. The diverter/mixing valve of claim 16, wherein the inlet connecting portion has a diameter less than a diameter of the outlet port of the main housing such that the inlet connecting portion slides into the outlet port in the main housing.

18. The diverter/mixing valve of claim 12, wherein the outlet portion of the outlet housing has a diameter less than the diameter of the inlet connecting portion such that the outlet housing tapers from the inlet connecting portion to the outlet portion.

19. The diverter/mixing valve of claim 12, wherein the inner sleeve further includes a plate attached to the second end of the inner sleeve and wherein the actuation device includes a disk that connects to the plate and rotates the barrel assembly when actuated.

20. The diverter/mixing valve of claim 12, wherein the actuation device is one of a radio controlled servo, an electronic actuation device, a hydraulic actuation device, a pneumatic actuation device, and a motor.

* * * * *